United States Patent [19]

Kimura et al.

[11] Patent Number: 4,901,063

[45] Date of Patent: Feb. 13, 1990

[54] IMAGE PROCESSING APPARATUS WHICH HELPS AN OPERATOR TO CHOOSE APPROPRIATE IMAGE PROCESSING

[75] Inventors: Hiroyuki Kimura, Yokohama; Masayuki Iimura, Kodaira; Makoto Katsuma, Saitama; Kazunobu Urushihara, Inagi; Susumu Matsumura, Yokohama; Hiroshi Ohmura, Wako, all of Japan

[73] Assignee: Canon Kabushiki Kaisha, Tokyo, Japan

[21] Appl. No.: 18,289

[22] Filed: Feb. 24, 1987

[30] Foreign Application Priority Data

Feb. 27, 1986 [JP] Japan .................. 61-40422

[51] Int. Cl.⁴ .............................................. G09G 1/00
[52] U.S. Cl. .................................. 340/723; 340/721; 364/521; 382/57
[58] Field of Search ............... 340/723, 725, 721, 734, 340/706, 701, 703; 382/57; 358/280; 364/518, 521

[56] References Cited

U.S. PATENT DOCUMENTS

| | | | |
|---|---|---|---|
| 4,524,421 | 6/1985 | Searby et al. | 340/706 |
| 4,617,596 | 10/1986 | Yoshida et al. | 382/57 |
| 4,642,621 | 2/1987 | Nemoto et al. | 340/723 |
| 4,721,951 | 1/1988 | Holler | 340/701 |

Primary Examiner—David K. Moore
Assistant Examiner—Jeffery A. Brier
Attorney, Agent, or Firm—Fitzpatrick, Cella, Harper & Scinto

[57] ABSTRACT

There is an image processing apparatus to obtain a desired processed image by performing a predetermined image process to an input image. This apparatus comprises: an image input unit to input the image data; an image processor which can perform different image processes; a selector to select the kind of image process to be executed by the image processor; a memory to store different sample processed images which were subjected to the image processes; and a display to display both a sample image before execution of the image process and the sample processed image corresponding to the selected image process from the memory in accordance with selection by the selector. The image processor can perform the edge extracting process, mosaic process, and the like. With this apparatus, the operator can easily obtain various sample processed images and can extend the processed image of the original image by merely inputting a processing command.

10 Claims, 4 Drawing Sheets

|  -1 | 0 | 1 |
|---|---|---|
| -1 | 0 | 1 |
| -1 | 0 | 1 |

F I G. 3A

| -1 | 0 | 1 |
|---|---|---|
| -2 | 0 | 2 |
| -1 | 0 | 1 |

F I G. 3B

| -1 | 1 | 1 |
|---|---|---|
| -1 | -2 | 1 |
| -1 | 1 | 1 |

F I G. 3C

IMAGE PROCESSING APPARATUS WHICH HELPS AN OPERATOR TO CHOOSE APPROPRIATE IMAGE PROCESSING

BACKGROUND OF THE INVENTION

1. Field of the Invention

The present invention relates to an image processing apparatus and, more particularly, to an image processing apparatus for obtaining a desired processed image by performing predetermined image processes on an input image.

2. Related Background Art

Hitherto, such image processes are executed in accordance with the following procedure. First, the kind of process such as "edge extraction" is designated, i.e., a command for that type of processing is issued. However, for the edge extraction commands, such various differential operators as shown in, e.g., FIGS. 3A to 3C exist as parameters of the kinds of the processes having predetermined relations with the edge extraction commands. Therefore, the desired parameters are further designated. With respect to this point, it is intended to process the image to obtain a desired processed image as fast as possible. However, in general, it is impossible to grasp which processing effects are provided for the image by those differential operators until the image is actually processed. Therefore, to know the processing effects, trial and error is required and a considerable long time is required to perform each trial process.

The foregoing drawback also occurs in the processing of a pictorial image. For example, when mosaic process of a natural image is performed, the mosaic size needs to be designated. However, if the operator is not familiar with this operation, it is impossible to imagine to what extent the designated mosaic contributes in the actual image plane. Therefore, the mosaic process is first performed from the proper size. The mosaic size is corrected on the basis of the result of the mosaic process. Then, the mosaic process is again executed. In this manner, as can be seen, the procedure becomes undesirably long and troublesome.

For examples of the foregoing types a processing reference may be made to, e.g., U.S. Pat. No. 4,213,150 (Robinson et al.) and to Japanese Kokai Sho-58-14678 (Kashiki). It is to be understood, however, that the present invention is not concerned with the details of these, or any other particular, types of image processing, and such details are not essential to the broad invention. On the contrary, the present invention can advantageously be applied to any type or types of image processing.

SUMMARY OF THE INVENTION

It is an object of the present invention to provide an image processing apparatus which can eliminate the foregoing drawbacks of the conventional technique.

It is an object of one aspect of the invention to provide an image processing apparatus which can easily recognize the format of the final processed image.

It is an object of another aspect of the invention to provide an image processing apparatus which can learn the image processing effects of the kinds of various image processes and of, further, the kinds of processes having predetermined relations with the kinds of the selected processes.

The above and other objects and features of the present invention will become apparent from the following detailed description of the preferred embodiment and the appended claims, with reference to the accompanying drawings.

BRIEF DESCRIPTION OF THE DRAWINGS

FIGS. 3A to 3C are diagrams showing a matrix constitutions of differential operators.

DESCRIPTION OF THE PREFERRED EMBODIMENT

An image processing apparatus embodying the present invention and shown in FIG. 1 will first be schematically described hereinbelow.

Figure 4:
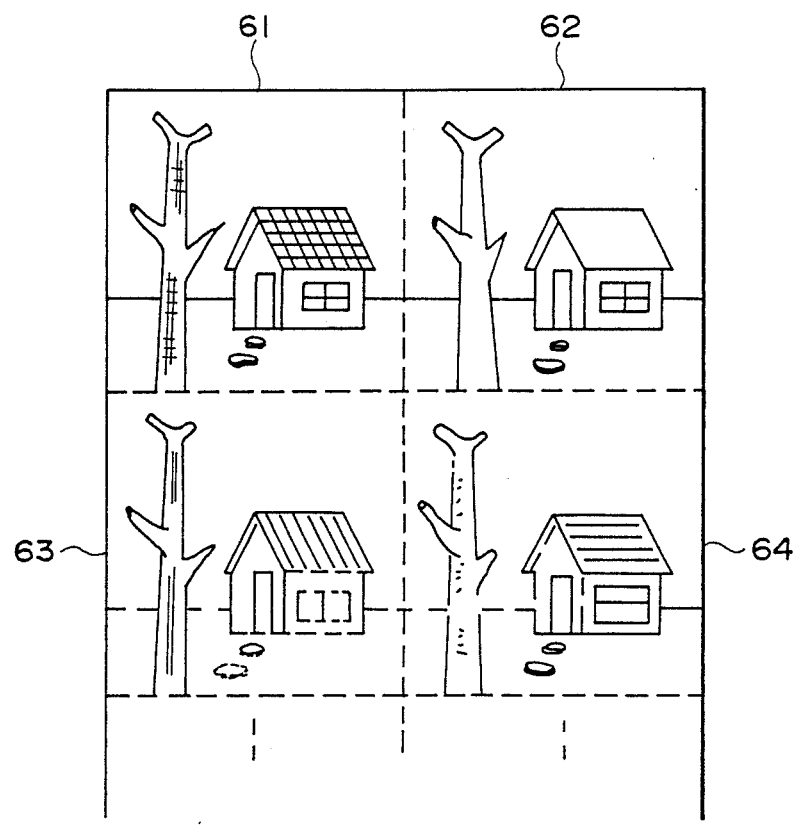
FIG. 4 is a diagram showing formats of sample images and sample processed images.

The image processing apparatus is constituted in such a manner that the input original image from an image input unit 1 is subjected to, for example, an edge extracting process or the like and a desired processed image is formed and supplied to an image output unit 8. This image processing apparatus comprises an image file 6 and display control means (CPU) 2. As shown in, e.g., FIG. 4, the image file 6 stores an original sample image 61 and a plurality of sample processed images 62, 63, 64, ... which are obtained by previously performing different kinds (parameters) of edge extracting processes as shown in FIGS. 3A to 3C for the sample image 61 in the case of, for example, the edge extracting process. In accordance with the selection of, e.g., the edge extracting process from a command input unit 5, the CPU 2 reads out preferably the sample image 61 and either one or more of that plurality of sample processed images 62, 63, ... from the image file 6 and displays them by means of a display unit 7.

Figure 1:
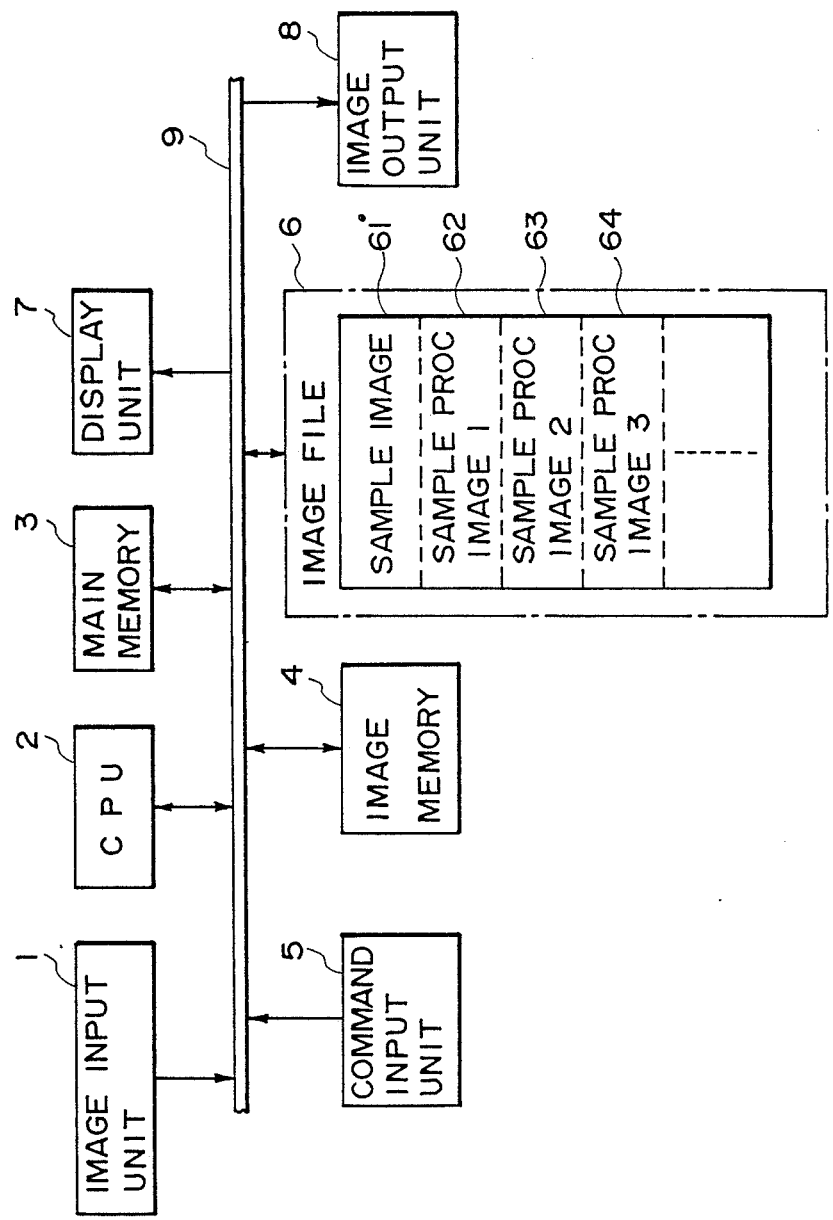
FIG. 1 is a block constitutional diagram of an image processing apparatus of the preferred embodiment of the present invention.

In such a constitution of FIG. 1, the CPU 2 stores the input images in an image memory 4 and displays them by means of the display unit 7. Next, when a processing command of, e.g., "edge extraction" is input from the command input unit 5, the CPU 2 reads out the sample image 61 and either one or more of the representative sample processed images 62, 63, ... which were previously subjected to the edge extracting processes from the image file 6. The CPU 2 then displays the readout images on a part of the display unit 7 together with the corresponding parameters. Thus, the operator can see the respective processing effects before designating the kind of inherent process.

When the parameter has been designated together with the "edge extraction" command, the sample processed image 62 corresponding to this parameter and sample processed images 62', 62", and the like (not shown) of the parameters (the parameters which are obtained by, e.g., changing the values of the component elements of a processing matrix) similar to that parameter are displayed on a part of the display unit 7.

FIG. 1 will now be described in detail. In the diagram, numeral 1 denotes the image input unit such as an image pickup camera, drum scanner, or the like. The A/D-converted digital image obtained from the image input unit 1 is stored in an image memory 4 through a comman bus 9. Numeral 5 denotes the command input unit such as a keyboard, digitizer, or the like to input image processing commands and various kinds of parameters; 6 is the image file in which the sample images 61 and its sample processed images 62, 63, 64, . . . and the like are stored; 7 the display unit to display the images from the image memory 4 and the image file 6 as necessary; and 8 the image output apparatus such as a printer, film recorder, or the like for outputting the processed images which are obtained by performing the image processes. A series of controls and processes of those components are executed by the central processing unit (CPU)2. The processing programs which are executed by the CPU 2 are as shown in, e.g., FIG. 2 and are stored in a main memory 3 consisting of a RAM and a ROM.

Figure 2:
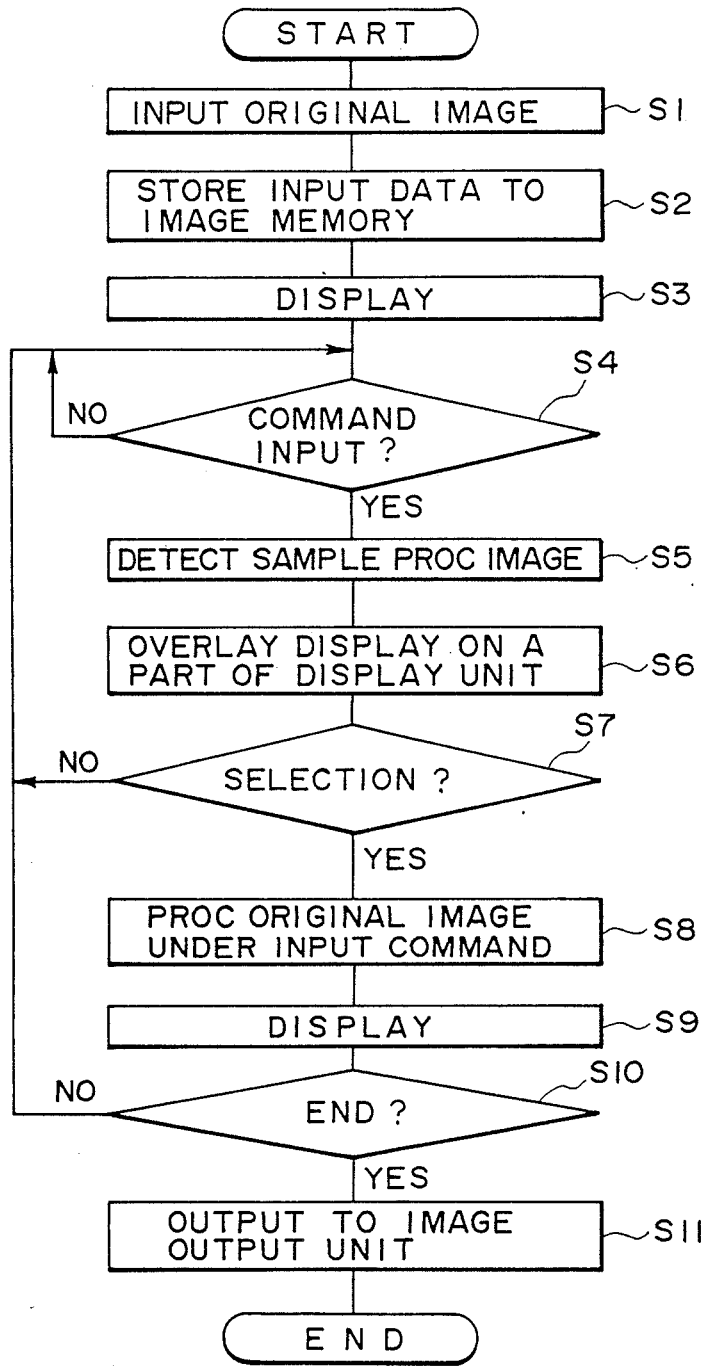
FIG. 2 is a flowchart showing an image processing procedure of the embodiment of FIG. 1.

FIG. 2 is a flowchart showing an image processing procedure of the embodiment.

In step S1, the original image is input from the image input unit 1 and A/D converted into the digital image. The digital image is stored into the image memory 4 in step S2. The original image is displayed by the display unit 7 in step S3. In step S4, the image processing command is input from the command input unit 5. When the command input unit 5 is the keyboard, the processing command is input by alphabets or Katakana characters. If the command input unit 5 is the digitizer, it is possible to use a method whereby the command written on the digitizing board is instructed or a method whereby after a command menu was displayed on the display unit 7, the cursor locating at the position corresponding to the designated point on the digitizing board is generated onto the display screen, then the cursor is moved onto a desired command and the button is pressed.

The input command is sent to the CPU 2. In step S5, the CPU 2 reads out a series of sample processed images 62, 63, . . . , and the like concerned with the input command from the image file 6. Preferably, the CPU 2 simultaneously reads out the sample image 61. It is sufficient for the experienced operator to use only the sample processed images. However, for example, by observing and comparing the sample image 61 with the sample processed images 62, 63, . . . , and the like, the operator can grasp various kinds of processing effects in detail. In step S6, the readout sample image 61 and the readout sample processed images 62, 63, . . . , and the like are displayed on a part of the display unit 7 so as to be overlaid. In addition, such parameter matrices or parameter numbers as shown in FIGS. 3A to 3C are also simultaneously displayed together with the sample processed images 62, 63, . . . , and the like. With this method, the operator can easily visualize the results of applying the various processes to the original image by observing both the sample image 61 and the sample processed images 62, 63, . . . , and the like in place of the original image, although they are different from the actual original image to be processed. In the case of performing the mosaic process as well, for example, the sample processed images which are similarly derived by sequentially changing the mosaic size from a small size to a large size are prepared.

On the other hand, if the parameter has been designated together with, e.g., the "edge extraction" command, for example, the sample processed image 62 corresponding to this parameter and the sample processed images 62', 62", and the like (not shown) of the parameters similar to that parameter are displayed on a part of the display unit 7. The parameters similar to the designated parameter are obtained by changing the value of each component element of, e.g., a processing matrix, although the feature of the constitutional pattern of the processing matrix is the same as that of the designated parameter. With such parameters, a small difference occurs in the results of the processes by slightly changing the constitutional values. Therefore, such a designating method is also useful for the experienced operator.

In step S7, the operator selects a desired paramerer and inputs it. For example, the operator can designate a desired parameter by inputting the reference numerals 62, 63, and the like, or 62', 62", and the like of the parameters, which numerals are displayed together with the sample processed images. Or, the cursor is moved onto a desired sample processed image and the digitizing button is pressed, thereby enabling the desired parameter to be designated. In step S7, on the other hand, if a desired processing result cannot be found out in a group of processes of, e.g., "edge extraction", the processing routine is returned to step S4 and another processing command is designated. If the parameter has been selected and input in step S7, step S8 follows and the original image is processed on the basis of the designated parameter. Therefore, it is possible to perform the process based on accurate recognition and presumption by the operator of the results of the processes instead of the conventional approach based on trial and error. Therefore, the operator can easily approach the final processing result. In step S9, the processed image is displayed on the display unit 7. In this case, the processed image is displayed in place of the original image. Namely, this processed image is used as the original image to execute the image process at the next stage. In the image processes of the embodiment, by executing such a series of processes, the operator can efficiently reach the final processed image at the highest speed. In step S10, a check is made to see if the processes have been finished or not. If the operator instructs the continuation of the processes, the processing routine is returned to step S4. If the processes have been completed, the final processed image is supplied to the image output unit 8 in step S11.

As described above, by merely inputting a command, the operator can select the desired effect on the basis of the sample images or the like even if he or she does not know the effect provided for the image by each parameter, so that the method of the invention is very effective. Moreover, as compared with the conventional apparatus in which the most desirable image is selected after completion of the processes on the basis of various kinds of processes and parameters, time and labor can be remarkably reduced.

The image file 6 can be used to search similar commands. Namely, the sample processed images of similar commands are sequentially searched. For example, in the case of the mosaic process, as well as the simple mosaic process to vertically and horizontally equalize the image, it is also possible to consider the other similar mosaic processes such that the mosaic in the oblique direction, mosaic of an equilateral triangle, mosaic of a regular hexagon, mosaic whose size varies, and the like. If these similar mosaic processes can be also searched by inputting the commands of "mosaic", the operator can extend the processed image of the original image. The operator can also use the processed image for the purpose of study of unknown commands.

As described above, according to the invention, by providing the files of the sample image and sample processed images for the image processing apparatus, the kind or parameter of the image process can be easily selected. On the other hand, by searching the sample processed image, it is useful to extend the processed image. The invention can be also used to study the kind of process on the basis of the kind, parameter, or the like of the image process.

The present invention is not limited to the foregoing embodiments but many modifications and variations are possible within the spirit and scope of the appended claims of the invention.

What we claim is:

1. An image processing apparatus comprising:
   an image processor having a capability of executing first and second image processes, kinds of said first and second image processes being respectively different from each other, and said image processor being capable of executing each of those image processes wherein processing parameters are changed respectively for the first and the second image processes;
   memory means for storing in advance a plurality of sample processed images, the plurality of sample processed images being obtained by changing the processing parameters respectively for the first and the second image processes;
   selecting means for selecting one of the first and second image processes to be executed by said image processor; and
   display means for displaying, from among the stored plurality of sample processed images respectively for the first and second image processes, the plurality of sample processed images for the image process selected by said selecting means together with their processing parameters.

2. An image processing apparatus according to claim 1, wherein said memory means stores a sample image before execution of the image process together with the plurality of sample processed images, and said display means simultaneously displays both the sample image before execution of the image process and the plurality of sample processed images.

3. An image processing apparatus according to claim 1, further comprising input means for inputting image data, and wherein said display means displays both the input image and the plurality of sample processed images.

4. An image processing apparatus according to claim 1, wherein said first image process is an edge extracting process.

5. An image processing apparatus according to claim 1, further comprising designating means for designating said processing parameters, and wherein said image processor processes an image in accordance with the kind of the image process selected by said selecting means and said processing parameter designated by said designating means.

6. An image processing apparatus comprising:
   input means for inputting an image;
   an image processor capable of executing first and second image processes for one image, kinds of the first and the second image processes being respectively different from each other, and said image processor being capable of executing respectively for the first and the second image processes a plurality of image processes wherein processing parameters are respectively changes;
   selecting means for selecting one of the first and second image processes to be executed by said image processor;
   display means for displaying a plurality of sample processed images of whichever of the first and second image processes has been selected by said selecting means, together with their processing parameters; and
   determining means for determining the processing parameters for the image process selected by said selecting means,
   wherein said image processor executes the image process for image input by said input means, after said determining means determines said processing parameter.

7. An image processing apparatus according to claim 6, further comprising memory means for storing in advance the plurality of sample processed images which are obtained by changing the processing parameters respectively of the first and second image processes, and
   wherein said display means displays, from among the plurality of sample processed images stored in said memory means the plurality of sample processed images of the image process selected by said selecting means, together with their processing parameters.

8. An image processing apparatus according to claim 6, wherein said display means displays both the input image input by said input means and the plurality of sample processed images.

9. An image processing apparatus comprising:
   an image processor which can execute first and second processes for one image, the first and second image processes being respectively different from each other, and said image processor being capable of executing a plurality of image processes wherein processing parameters are changed respectively for the first and the second image processes;
   input means for inputting a selection command to select the first or the second image process or the processing parameters; and
   display means for displaying at least one sample processed image on the basis of an input made by means of said input means,
   wherein said display means displays a plurality of sample processed images with respect to the selected image process in a case where said input means inputs the selection command, and displays the sample processed image corresponding to the processing parameter of the selected image process in a case where said input means inputs the selection command and the processing parameter.

10. An image processing apparatus according to claim 9, further comprising memory means in which is stored in advance the plurality of sample processed images which are respectively obtained by changing the processing parameters respectively for the first and the second image processes, and
    wherein said display means the sample processed image which is based on the input of said input means, from among the plurality of sample processed images stored in said memory means.

* * * * *

UNITED STATES PATENT AND TRADEMARK OFFICE
CERTIFICATE OF CORRECTION

PATENT NO. : 4,901,063

DATED : February 13, 1990

INVENTOR(S) : Hiroyuki Kimura, et al

It is certified that error appears in the above-identified patent and that said Letters Patent is hereby corrected as shown below:

IN [57] ABSTRACT

Line 14, "with" should read --with the--.

COLUMN 1

Line 33, "process" should read --processing--.

COLUMN 3

Line 2, "images" should read --image--.

COLUMN 6

Line 2, "changes;" should read --changed;--.
Line 12, "parameters" should read --parameter--.
Line 62, "means" should read --means displays--.

Signed and Sealed this

Eighteenth Day of June, 1991

*Attest:*

HARRY F. MANBECK, JR.

*Attesting Officer*     *Commissioner of Patents and Trademarks*